INVENTOR.
BARRIE BRIGHTMAN
BY
Robert L. Nathans
ATTORNEY 3,131,319

ELECTRONIC SWITCHING DEVICE UTILIZING CONTROLLED SOURCES OF ELECTROMAGNETIC RADIATION

Barrie Brightman, Webster, N.Y., assignor to General Dynamics Corporation, Rochester, N.Y., a corporation of Delaware Filed Apr. 24, 1961, Ser. No. 104,966
2 Claims. (Cl. 307—117)

Figure 1:
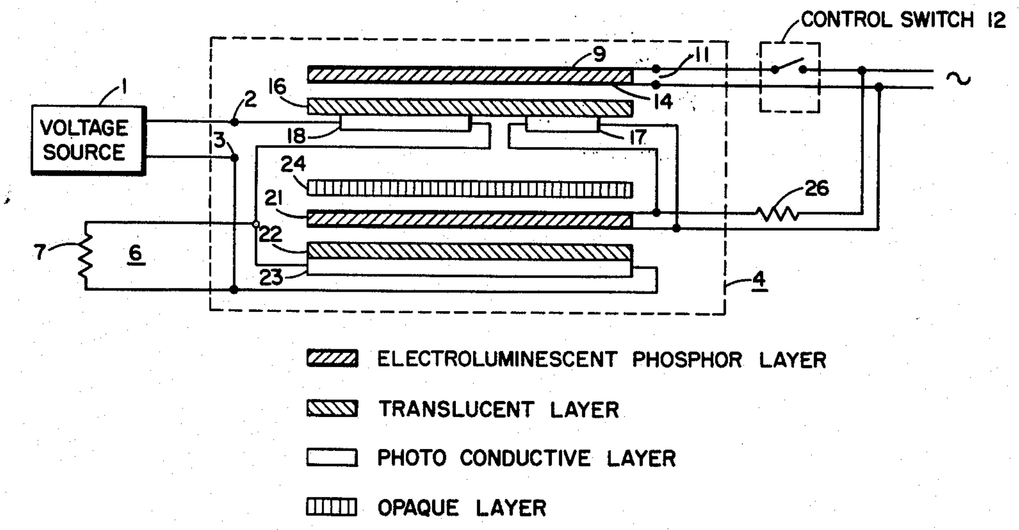

The present invention relates to switching devices and, more particularly, to switching devices which utilize electromagnetic radiation, such as light, for operating purposes.

In recent years, there has been a pronounced tendency in the electrical field toward the elimination of electromechanical relays and the substitution of electronic switching devices in their place. Many electronic switching devices, such as transistors, hard tubes, neon tubes, thyratrons and semiconductor diodes, are comparatively compact and inexpensive compared to electromechanical relays and, furthermore, operate at considerably higher speeds. However, one of the disadvantages of electronic switching devices lies in the relatively low off-to-on insection loss ratio compared to the off-to-on insertion loss ratio of a pair of metallic contacts of an electromechanical relay. In other words, when a pair of relay contacts are open (off), the insertion loss offered by the contacts approaches infinity, whereas the insertion loss of a closed (on) pair of metallic relay contacts approaches zero. Since this is not true with regard to electronic switching devices, numerous problems arise where these devices are utilized. For instance, in the telephone field, the fact that unactuated or opened electronic switches display only moderate insertion losses causes undesirable cross-talk and leakage current, as will be explained more fully hereinafter. As a result, in a complex space devision telephone system, literally thousands of relay contacts are required at present. It is, therefore, apparent that the substitution of extremely inexpensive and compact switching devices having the A.C. insertion loss characteristics of electromechanical relay contacts would represent a major step forward in the art. Of course, this particular problem is not confined to the telephone field but extends throughout the electronics field in general.

Accordingly, it is a principal object of the present invention to provide a new and improved switching device utilizing controlled sources of electromagnetic radiation, such as light waves.

It is a further object of the present invention to provide a new and improved switching device having a very high off-to-on insertion loss ratio and which is extremely light in weight, compact, and may be manufactured for under six cents.

It is a feature of the present invention to provide a new and improved switching device having a first resistor coupled in series relationship with the controlled circuit and a second resistor coupled in shunt relationship with the controlled circuit together with means for changing the degree of electromagnetic radiation applied to the first resistor in one sense, while changing the degree of electromagnetic radiation applied to the second resistor in an opposite sense, thereby to cause the relay to change its state of conduction.

Further objects, features, and advantages of the invention will become apparent as the following description proceeds, and the features of novelty which characterize the invention will be pointed out with particularity in the claims annexed to and forming a part of this specification.

Figure 2:
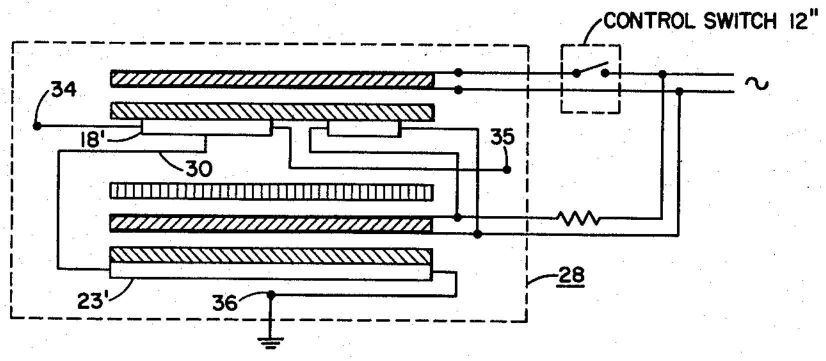

For a better understanding of the invention, reference may be had to the accompanying drawings in which:

FIGURE 1 discloses one embodiment of the present invention;

FIGURE 2 discloses a second embodiment of the present invention; and

Figure 3:
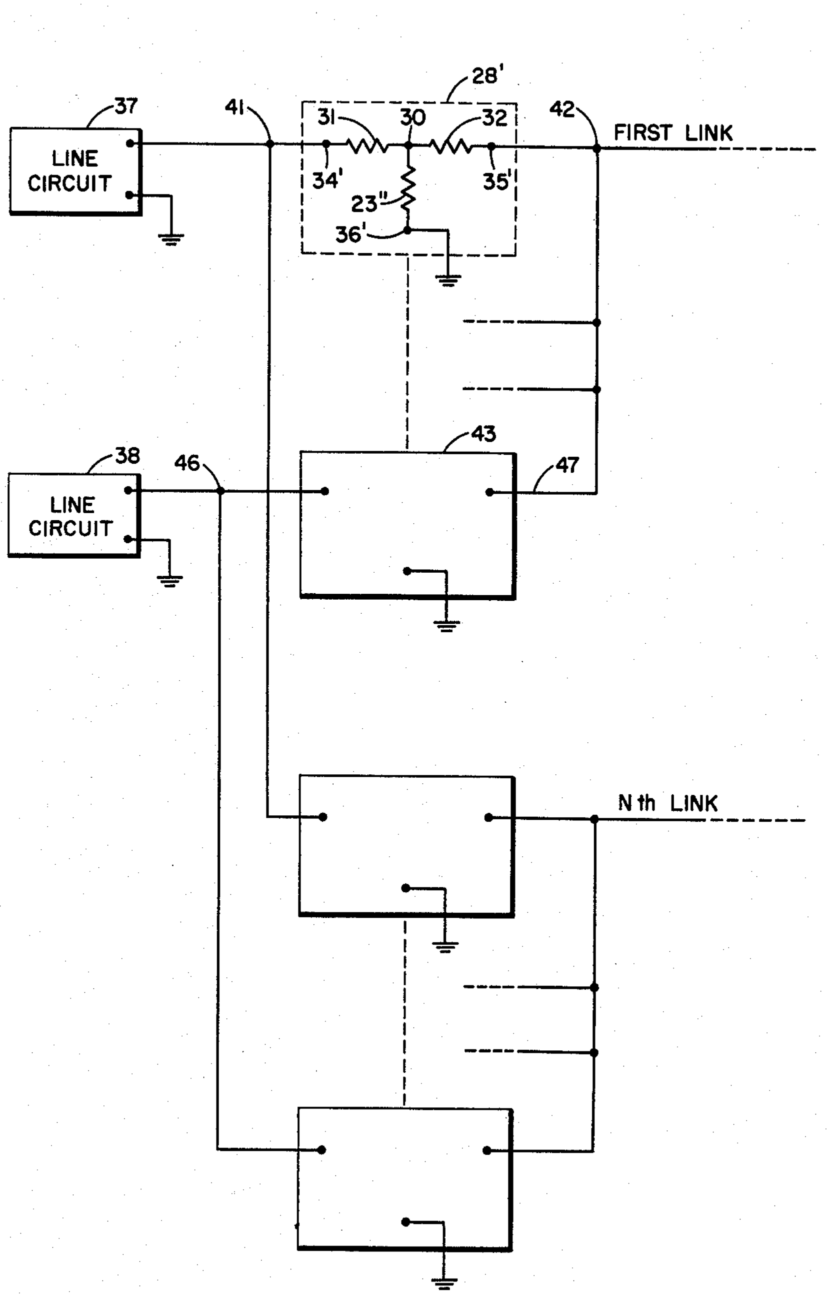

FIGURE 3 discloses a portion of a telephone system which illustrates schematically the manner in which the second embodiment of the present invention, disclosed in FIGURE 2, may be utilized to connect line circuits with transmission links.

Referring now to FIGURE 1, voltage source 1 is disclosed connected to input terminals 2 and 3 of switch 4, which is utilized to control current flow through an external circuit 6, which includes a load device 7. Switch 4 comprises a plurality of thin layers of various substances which are, in fact, compressed together in the manner of a sandwich. FIGURE 1 discloses these layers in an "exploded" manner. It should be appreciated that the thicknesses of the layers have been greatly exaggerated in the drawing for the sake of clarity and, as a practical matter, switch 4 may be made extremely small. An electroluminescent phosphor lamp 9 is schematically disclosed having input terminals 11 coupled to a source of A.C. voltage through a control switch 12. The construction of this lamp forms no part of the present invention and is in fact well known in the art. For an example of such a lamp, reference may be made to pages 1888–9 of the December 1955 issue of the I.R.E. Proceedings. When control switch 12 is closed, a potential is impressed across the electroluminescent phosphor layer to cause light rays to be emitted by the layer. The conductive layer 14 is translucent so that when control switch 12 is closed, light passes through transparent or translucent layer 16 to impinge upon photoconductive segments 17 and 18. These segments, in practice, would probably be no more than sprayed coatings of zinc sulphide, or the like, affixed upon translucent or transparent layer 16, which could be glass. The composition of the photoconductive layer forms no part of the present invention since such a layer having a resistance which varies depending upon the intensity of light or other electromagnetic radiation impinging thereon has been known in the art for many years. A second electroluminescent lamp 21 is disclosed in cooperative relationship with a transparent or translucent layer 22, which in turn is positioned against photoconductive layer 23. Opaque layer 24 is utilized to prevent any electromagnetic radiation emitted by lamp 21 from impinging upon variable resistors 17 and 18 and, in addition, prevents any radiation emitted by electroluminescent lamp 9 from passing through lamp 21 and layer 22 to affect variable resistor 23. The input terminals of lamp 21 are coupled to the aforementioned A.C. source through resistor 26. Variable resistor 17 is connected across the input terminals of lamp 21.

The operation of switch 4 is as follows: when control switch 12 is open, no radiation is emitted by lamp 9 so that resistor 18 assumes a state of high impedance. Accordingly, an insufficient amount of current flows through load device 7 to operate it. At this time, resistor 17 also assumes a high impedance state so that sufficient voltage drop is present across resistor 17 to cause lamp 21 to be lit, which in turn causes photoconductive layer 23 to assume a state of low impedance, thereby to shunt load device 7. It should be observed that the high impedance state of resistor 18, which is in series with load 7, and the low impedance state of resistor 23, which is in shunt with load 7, both operate in complementary fashion to insure the non-operability of the load device. Opaque layer 24 prevents any of the radiation emitted by lamp 21 from affecting resistors 17 and 18.

Now let it be assumed that the switch is to be operated, thereby to pass operating current through load device 7. Control switch 12 is closed to cause lamp 9 to emit radiation, which in turn causes the impedances of resistors 17 and 18 to fall to an extremely low value. The lowering of the impedance of resistor 18 causes operating current to flow through external circuit 6 and load device 7. The lowered impedance of resistance 17 causes lamp 21 to be shunted so that it becomes turned off, which action in turn causes resistor 23 to assume a state of high impedance. The shunting effect of resistor 23, which is operative when control switch 12 is opened, is no longer in effect.

In summary, the impedances of series connected resistor 18 and shunt connected resistor 23 will at all times bear a "seesaw" relationship with each other so as to insure the operation or non-operation of load device 7. The off-to-on insertion loss ratio of the switch disclosed in FIGURE 1 will be in the neighborhood of $10^5$. It should be noted that this figure is considerably higher than the insertion loss ratios of solid state switches presently known in the art. This switch may be manufactured for approximately six cents and literally hundreds of them may be mounted upon a single sheet of glass.

A second embodiment of the present invention is disclosed in FIGURE 2. Conductor 30 is coupled to a central portion of photoconductive layer 18' so that this layer is, in effect, a tapped resistor. This resistor could also be represented by separate resistors 31 and 32, disclosed in FIGURE 3. Resistor 23'', of FIGURE 3, corresponds to layer 23' of FIGURE 2. The photoconductive layers are connected to terminals 34, 35, and 36, as shown in FIGURE 2. Corresponding terminals 34', 35', and 36' are disclosed in FIGURE 3.

The arrangement disclosed in FIGURE 3, which utilizes the FIGURE 2 embodiment, schematically illustrates a portion of a space division matrix of a telephone switching system. Let it be assumed that line circuit 37 is to be coupled to the first transmission link through switch 28' which, of course, corresponds to switch 28, disclosed in FIGURE 2. It is, therefore, necessary to cause the impedances of resistors 31 and 32 to assume a low impedance and to cause shunt impedance 23'' to assume a high impedance. Since the off-to-on insertion loss ratio of the switch of the present invention is extremely high, this means that the impedance between junction points 41 and 42 will be extremely low when the switch is actuated by closing control switch 12'' but will be extremely high when control switch 12'' is opened. In the case where solid state switching devices were utilized, although switch 43 was supposedly not operated, the impedance between junction points 46 and 47 was not high enough to prevent leakage or crosstalk between line circuit 37 and line circuit 38. It cannot be overemphasized that the resulting crosstalk due to the use of solid state switches in telephone space division matrices and the high cost of these switches has been a major stumbling block in the further development of this type of telephone system. Of course, electromechanical relays do not present this problem, but their weight and bulkiness makes them relatively impracticable for future use along these lines.

It is necessary in the aforementioned telephony application of the present invention to have split resistor 18' or, in other words, resistors 31, 32 in place of single resistor 18 disclosed in FIGURE 1. This will become apparent from the following analysis: if resistor 32 were eliminated, the actuation of switch 28' would cause the impedance of resistor 31 to drop sharply, as previously explained, which in turn would cause line circuit 37 to be coupled to the first transmission link. However, when switch 28' becomes deenergized, the impedance of resistor 23'' will assume a low impedance state so that, although line circuit 37 is decoupled from the first transmission link, resistor 23'' would short circuit the first link so that other line circuits, such as line circuit 38, could not utilize the first transmission link for transmission purposes. If resistor 31 were eliminated, changes in the impedance of resistor 32 would couple and decouple line circuit 37 from the first transmission link. However, when it is desired to decouple line circuit 37 from the first transmission link, resistor 23'' would assume a low impedance state so that line circuit 37 would be short circuited when decoupled from the link. This state of affairs is unsatisfactory. Accordingly, the "splitting" of resistor 18 by means of tap 30 is required where the present invention is utilized in a space division telephone matrix. Again, as in the case of the embodiment disclosed in FIGURE 1, the "seesaw" relationship between the changes in the impedances of resistors 31 and 32 on the one hand and resistor 23'' on the other hand insures a very high off-to-on insertion loss ratio which tends to approach that of an electromechanical relay.

It should be understood that the present invention is not to be limited to electroluminescent lamps since various types of variable resistors are known, the resistances of which may be changed by varying the degree of other types of electromagnetic radiation other than light rays impinging thereon.

While there has been disclosed what are at present considered to be the preferred embodiments of the invention, other modifications will readily occur to those skilled in the art. It is not, therefore, desired that the invention be limited to the specific arrangements shown and described, and it is intended in the appended claims to cover all such modifications as fall within the true spirit and scope of the invention.

What is claimed is:

1. A switching circuit for controlling current flow through an external circuit comprising, a first source of electromagnetic radiation having an energizing circuit, a second source of electromagnetic radiation having an energizing circuit, means for coupling an energizing source to the energizing circuits of said first and second sources, a first impedance, the impedance of which may be varied by changing the degree of electromagnetic radiation directed thereon, said first impedance being positioned adjacent said first source, means for coupling said first impedance in series relationship with said external circuit to control the current flow through said external circuit, a second impedance, the impedance of which may be varied by changing the degree of electromagnetic radiation directed thereon, said second impedance being positioned adjacent said first source, means for coupling said second impedance in shunt across the energizing circuit of said second source so that when said first source is energized said second source will be deenergized, a third impedance, the impedance of which may be varied by changing the degree of electromagnetic radiation directed thereon, said third impedance being positioned adjacent said second source of electromagnetic radiation, means for coupling said third impedance in shunt with said external circuit, and means for preventing electromagnetic radiation emitted by said first source from affecting said third impedance and for preventing electromagnetic radiation emitted by said second source from affecting said first and second impedances.

2. A switching circuit for controlling current flow through an external circuit comprising, a first source of electromagnetic radiation having an energizing circuit, a second source of electromagnetic radiation having an energizing circuit, a control switch for actuating said switching circuit, a source of energizing current, means for coupling said control switch between said source of energizing current and the energizing circuit of said first source so as to cause said first source to emit electro-magnetic radiation upon the actuation of said control switch, a first impedance, means for coupling the energizing circuit of said second source to said source of energizing current through said first impedance, a second impedance, the impedance of which may be varied by changing the degree of electromagnetic radiation directed thereon, said second impedance being positioned adjacent said first source, means for coupling said second impedance in series relationship with said external circuit to control the current flow through said external circuit, a third impedance, the impedance of which may be varied by changing the degree of electromagnetic radiation directed thereon, said third impedance being positioned adjacent said first source, means for coupling said third impedance in shunt across the energizing circuit of said second source so that when said first source is turned on upon the actuation of said control switch said second source will be turned off, a fourth impedance, the impedance of which may be varied by changing the degree of electromagnetic radiation directed thereon, said fourth impedance being positioned adjacent said second source of electromagnetic radiation, means for coupling said fourth impedance in shunt with said external circuit, and means for preventing electromagnetic radiation emitted by said first source from affecting said fourth impedance and for preventing electromagnetic radiation emitted by said second source from affecting said second and third impedances.

References Cited in the file of this patent

UNITED STATES PATENTS

| | | |
|---|---|---|
| 2,782,307 | Von Sivers et al. | Feb. 19, 1957 |
| 2,790,088 | Shive | Apr. 23, 1957 |
| 2,839,690 | Kazan | June 17, 1958 |
| 2,907,001 | Loebner | Sept. 29, 1959 |
| 2,947,874 | Tomlinson | Aug. 2, 1960 |